(12) United States Patent
Huang et al.

(10) Patent No.: US 9,001,535 B2
(45) Date of Patent: Apr. 7, 2015

(54) POWER QUALITY DEVICE AND ITS CONTROL APPARATUS

(71) Applicants: Heng Huang, Taoyuan Hsien (TW); Bin Wang, Taoyhuan Hsien (TW); Hongyang Wu, Taoyuan Hsien (TW); Jingtao Tan, Taoyuan Hsien (TW)

(72) Inventors: Heng Huang, Taoyuan Hsien (TW); Bin Wang, Taoyhuan Hsien (TW); Hongyang Wu, Taoyuan Hsien (TW); Jingtao Tan, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 220 days.

(21) Appl. No.: 13/708,840

(22) Filed: Dec. 7, 2012

(65) Prior Publication Data

US 2014/0002034 A1      Jan. 2, 2014

(30) Foreign Application Priority Data

Jun. 29, 2012    (CN) .......................... 2012 1 0222518

(51) Int. Cl.
*H02M 1/12*      (2006.01)
*G05F 1/70*      (2006.01)

(52) U.S. Cl.
CPC .. *G05F 1/70* (2013.01); *Y02E 40/30* (2013.01)

(58) Field of Classification Search
CPC ................ H02M 1/12; H02J 3/01; H02J 3/18
USPC ................ 323/225, 271, 272, 350, 205, 207; 307/105, 126; 700/297
See application file for complete search history.

(56) References Cited

U.S. PATENT DOCUMENTS 4,384,321 A * 5/1983 Rippel .......................... 363/124
(Continued)

FOREIGN PATENT DOCUMENTS

CN      101847891 A      9/2010
CN      201984120 U      9/2011
(Continued)

OTHER PUBLICATIONS

Linear Technology, LTC1629/LTC1629-PG PolyPhase, High Efficiency, Synchronous Step-Down Switching Regulators, Product Data Sheet, pp. 1-28, www.linear.com/product/LTC1629, Linear Technology Corporation, Milpitas, CA., 1999.

(Continued)

*Primary Examiner* — Gary L Laxton
(74) *Attorney, Agent, or Firm* — Tim Tingkang Xia, Esq.; Morris, Manning & Martin, LLP

(57) ABSTRACT

A control apparatus for a power quality device comprises: a power quality analysis module, for sampling a power supply network to obtain a power quality information, and performing an analysis and computing on the sampling, so as to output an instruction information; N tracking control modules, for receiving respectively the instruction information and tracking the instruction information, so as to output N PWM control signals having a same frequency and constant phase shift therebetween, where N is a positive integer and N≥2, thereby to control the power quality device; wherein the power quality analysis module and the N tracking control modules are operated based on a synchronized signal.

18 Claims, 7 Drawing Sheets

(56) References Cited

U.S. PATENT DOCUMENTS

| | | | |
|---|---|---|---|
| 5,977,660 A | 11/1999 | Mandalakas et al. | |
| 6,274,851 B1* | 8/2001 | Mulcahy et al. | 219/501 |
| 7,378,821 B2* | 5/2008 | Simpson, III | 323/205 |
| 7,737,672 B2* | 6/2010 | Kudo | 323/284 |
| 7,796,412 B2* | 9/2010 | Fornage | 363/97 |
| 8,482,948 B2 | 7/2013 | Chen | |
| 2013/0073109 A1* | 3/2013 | Cheng et al. | 700/298 |

FOREIGN PATENT DOCUMENTS

| | | |
|---|---|---|
| CN | 202121324 U | 1/2012 |
| TW | 201121191 A1 | 6/2011 |

OTHER PUBLICATIONS

Intellectual Property Office, Ministry of Economic Affairs, R.O.C., "Office Action", dated Jul. 25, 2014, Taiwan.

* cited by examiner

US 9,001,535 B2

1

POWER QUALITY DEVICE AND ITS CONTROL APPARATUS

CROSS REFERENCE TO RELATED APPLICATIONS

The present application claims priority under 35 U.S.C. §119 to Chinese Patent Application No. 201210222518.0, filed on Jun. 29, 2012, the entire content of which is incorporated herein by reference.

TECHNICAL FIELD

The present application relates to a power quality device and its control apparatus.

BACKGROUND

Nowadays various kinds of power devices are widely used, as this brings a series of convenience and benefits in technical and economical sense, it makes the power supply network increasingly affected by pollution, in which two of the most prominent problems are the harmonic pollution and reactive power pollution. On the other hand, modern electronic equipments have increasingly high power quality requirements on the power grid, while the increasingly serious pollution in the power grid in turn damages these sensitive electronic equipments, which results in the life of modern electronic devices becoming shorter and shorter.

Thus, the elimination of pollution from harmonic and reactive power becomes an important research topic in power electronics technology. In order to reduce or even eliminate pollution from harmonics and reactive power to a power grid, various countries have proposed the concept of "green grid", and various kinds of power quality devices capable of eliminating the harmonics and performing reactive power compensation came into being. Now, a variety of power quality devices has undergone an unprecedented development, and has been widely used in industries with severe harmonic pollution such as buildings, railway, metallurgy, steel rolling, and machinery manufacturing industries. With the development of high-power switching technology, the traditional passive compensation devices (such as capacitance compensation cabinet, etc.) are gradually replaced by active power quality devices (such as active power filters, static var generator, etc.), and the active power quality devices have become dominant in the development.

For example, a typical structure of an active power quality device may be configured as following: a control apparatus samples the information of the power grid or loads of a power supply network, obtains instruction information containing components of harmonics and/or reactive power of the loads, so as to control power switching devices of the power quality device, and feed back the signal generated by the power switching devices to the power grid.

At present the control apparatus of an active power quality device is mainly configured as single-core based control apparatus. As shown in FIG. 1, the single-core based control apparatus controls the power switching devices of a power quality device by a single processing unit. It has the following features: all functions of detecting power quality and analyzing power quality measurements or instruction tracking control, are implemented by one processing unit, thus the degree of integration is high. However, it has the following disadvantages: 1) due to large amount of computing, it has higher requirements on the performance of the processing unit, for example, the computing speed of the processing unit is required to be faster; 2) the manufacturing cost of the power switching devices is also higher.

SUMMARY OF THE INVENTION

With respect to the above shortcomings in the prior art technology, the present application provides a power quality device and its control apparatus.

In one aspect of the present application, the control apparatus of a power quality device comprises: a power quality analysis module, for sampling a power supply network to obtain power quality information, by performing analysis and computing on the sampling, so as to output instruction information; N tracking control modules, for receiving respectively the instruction information from the power quality analysis module and tracking the instruction information, so as to output N PWM control signals to control the power quality device; wherein the power quality analysis module and the N tracking control modules are operated based on a synchronized signal, the frequencies of the N PWM control signals are equal and there exist constant phase shifts between any adjacent two of the N PWM control signals, where N is a positive integer and N≥2.

In another aspect of the present application, a power quality device comprises: the above control apparatus for outputting the N PWM control signals with constant phase shifts existing therebetween; N power compensation modules, which are connected in parallel with each other, receive corresponding ones of the N PWM control signals respectively and generate compensation electric energy, and feed back the compensation electric energy to the power supply network.

With the control apparatus of the present application, in part, in view of meeting the equal performance criteria, the burden of a single processing unit is reduced, or the performance requirement on the processing unit can be greatly reduced. In addition, the present application may reduce the cost of the control apparatus.

DESCRIPTION OF THE EMBODIMENTS

In the following the embodiments of the present application are described in detail with reference to the figures. It should be noted that the embodiments described here is for illustrative purposes only and is not used to limit the present application.

The first aspect of the present application discloses a control apparatus of a power quality device, the content given below is for helping understand the control apparatus of a power quality device disclosed by the first aspect.

Figure 1:
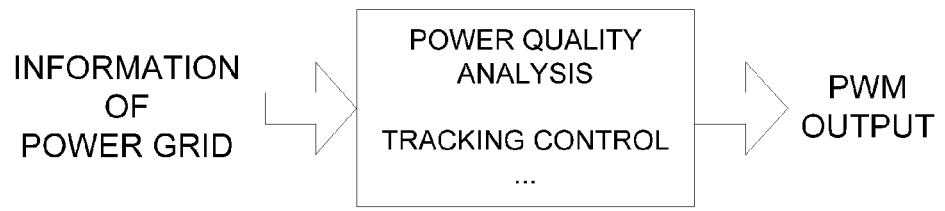
FIG. 1 is a schematic diagram of a single-core based control apparatus in the related art technology.
Figure 2:
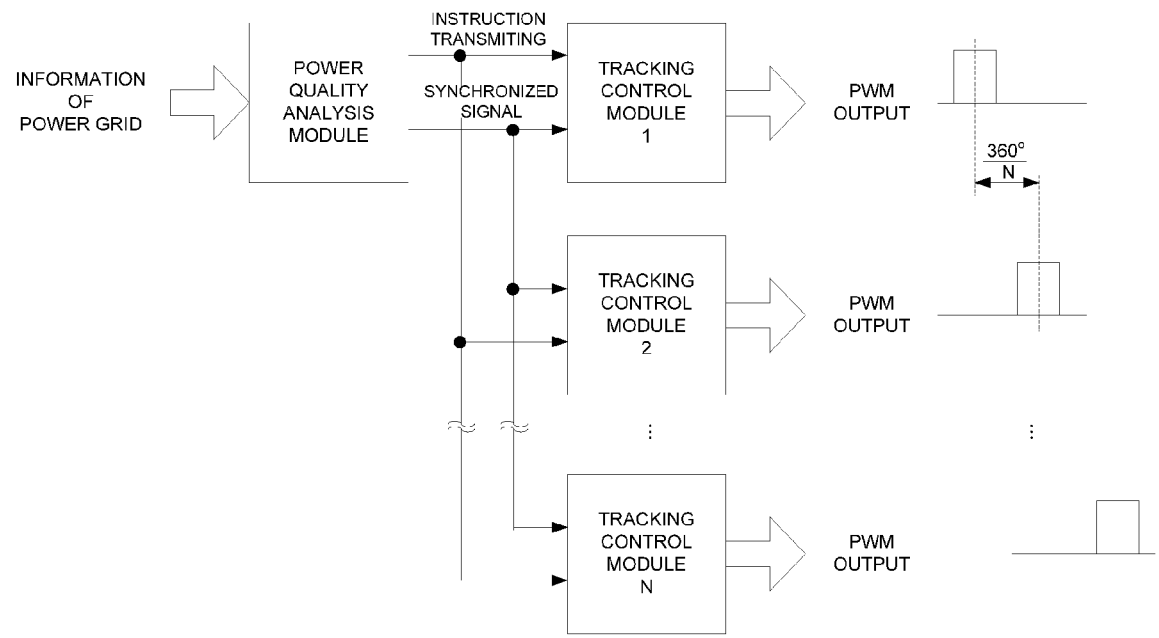
FIG. 2 is a schematic diagram of the control apparatus of a power quality device according to an embodiment of the application.

As the specific embodiment of a control apparatus shown in FIG. 2, such a control apparatus can be adopted in a power quality device. The control apparatus comprises a power quality analysis module and N tracking control modules (the 1st-the Nth tracking control modules), where N is a positive integer and N≥2. Wherein the power quality analysis module can collect signal samples in a power supply network to obtain the power quality information by performing analysis and computation on control parameters related to the power quality, so as to obtain instruction information reflecting components of harmonics and/or reactive power of the loads (i.e., pollution components contained in the power grid). The 1st-the Nth tracking control modules receive respectively the instruction information and tracking it, so as to track the load changes in the grid, and thus to output N PWM control signals to control the power quality device.

As shown in FIG. 2, in the present application, the power quality analysis module and the 1st-the Nth tracking control modules are operated based on a synchronized signal, which is transmitted to each other between these modules, so as to allow these modules to keep synchronized with each other, thereby the PWM control signals output by the 1st-the Nth tracking control modules have the same frequency but different phases, while the phase shifts remains constant.

In the control apparatus, interleave control can be enabled over the 1st-the Nth tracking control modules, and the interleave control allows the PWM control signals issued by the 1st-the Nth tracking control modules to have the same frequency but different phases. For example, the phase shift between two adjacent tracking control modules can be 360°/N. Such an interleave control helps to reduce the ripple content generated by the object that is controlled by the control apparatus. However, the power quality device disclosed in the first aspect of the present application is not limited by this.

In the control apparatus, the information that the power quality analysis module samples in the power supply network may be current and/or voltage information of the power grid or the loads.

Figure 3:
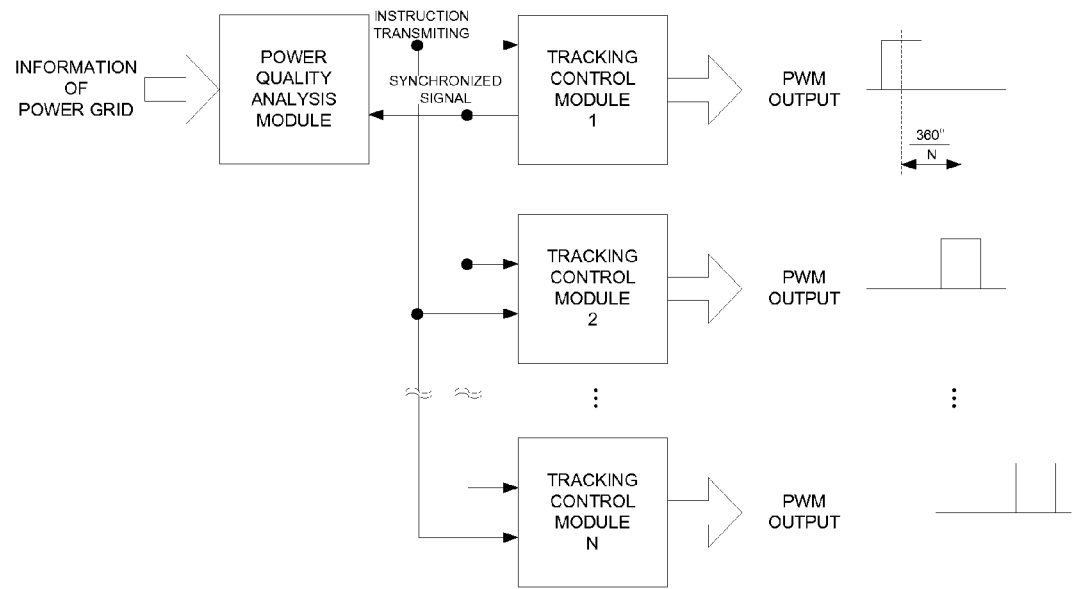
FIG. 3 is a schematic diagram of the control apparatus of a power quality device according to another embodiment of the application.
Figure 4:
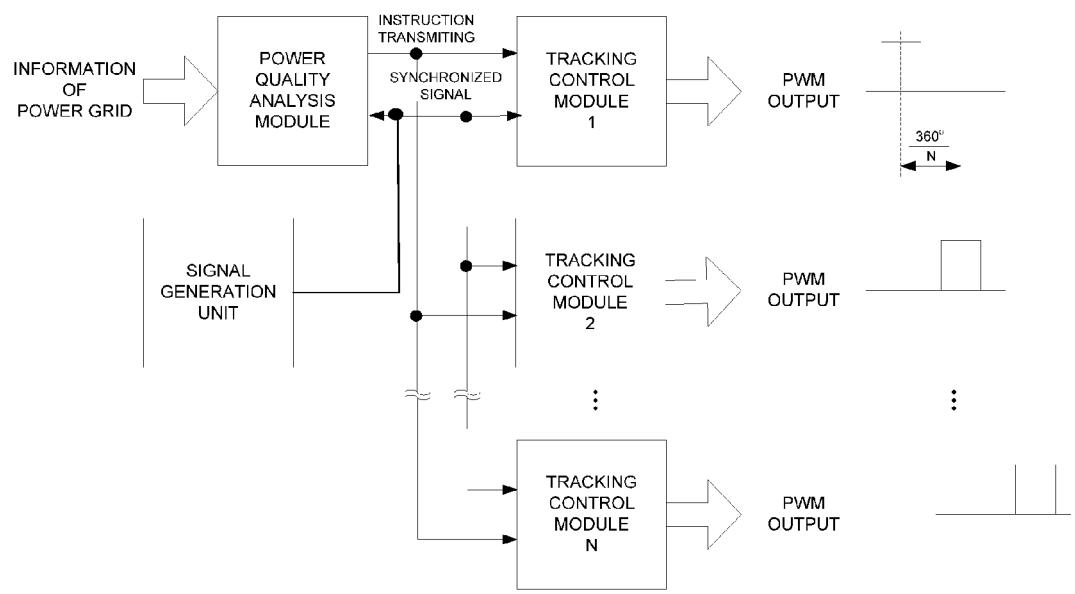
FIG. 4 is a schematic diagram of the control apparatus of a power quality device according to still another embodiment of the application.

In the control apparatus, the synchronization between the power quality analysis module and the 1st-the Nth tracking control modules can be implemented in a number of ways. For example, as in the first mode shown by FIG. 2, a synchronized signal is generated and sent to the 1st-the Nth tracking control modules by the power quality analysis module, so that a synchronization is achieved between the power quality analysis module and the 1st-the Nth tracking control modules. Alternatively, as in the second mode, a synchronized signal can be generated by any one of the 1st-the Nth tracking control modules and then sent to the power quality analysis module and the other tracking control modules. For example, referring to FIG. 3, a synchronized signal can be generated and sent to the power quality analysis module and the 2nd-the Nth tracking control modules by the 1st tracking control module. Alternatively, as in the third mode (see FIG. 4), a synchronized signal can also be generated and sent to the power quality analysis module and the 1st-the Nth tracking control modules by a separate signal generation unit, which can be arranged within the control apparatus as an integral part thereof, or arranged outside the control apparatus as a supporting component thereof. Other modes of implementation are no longer enumerated herewith.

The first type of embodiments of the control apparatus for the power quality device will be described below. Please referring to FIG. 5, each of the tracking control modules can comprise a phase shift unit and a tracking control unit. The phase shift unit receives a synchronized signal, delays the synchronized signal by a preset phase shift and then outputs the synchronized signal to the tracking control unit, wherein the phase shifts between the synchronized signals after being delayed by N phase shift units can be 360°/N. Next, the tracking control unit tracks the instruction information according to the received synchronized signal so as to output the PWM control signal.

Figure 6:
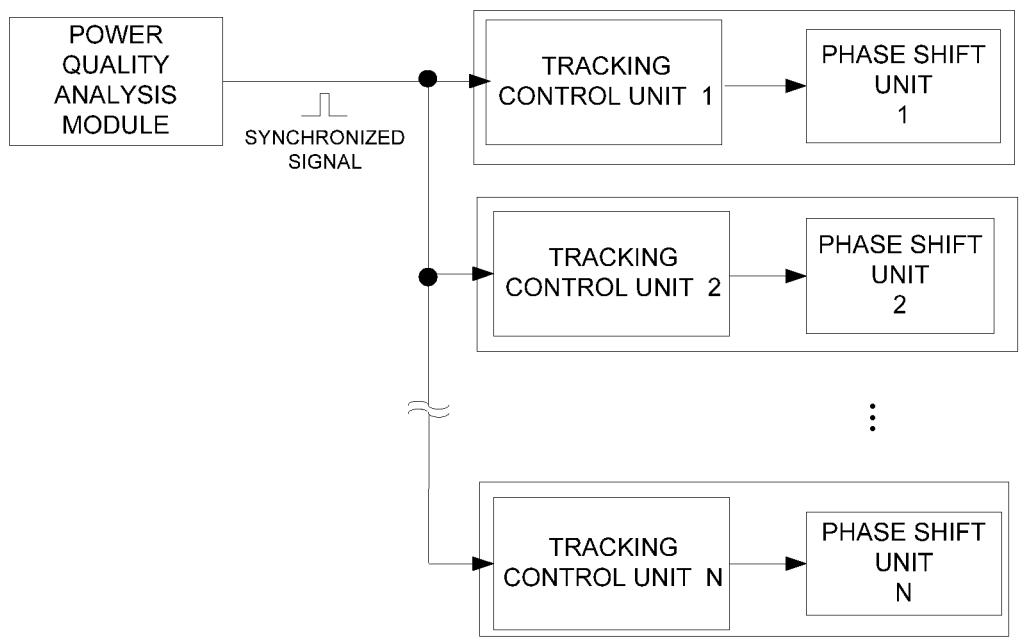
FIG. 6 is a schematic diagram of a control apparatus comprising a phase shift unit and a tracking control unit according to another embodiment of the application.

Alternatively, as shown in FIG. 6, it can also be configured as follow. The tracking control unit receives a synchronized signal and instruction information, and outputs a control signal to the phase shift unit. The phase shift unit delays the control signal and then outputs the PWM control signal with the constant phase shifts existing between the PWM control signals that are output from the N tracking control modules.

According to another example, it is possible to leave out a certain one of the N phase shift units, while the delay to the N PWM control signals are realized by the remaining N−1 phase shift units. Such an example can be regarded as being equivalent to a situation where the PWM control signal output by the tracking control module having no phase shift unit has a phase delay of 0 (zero) and acts as the basis for calculating the phase delays of the PWM control signals output from the other tracking control modules. This example is implementable for those skilled in the art and will not be illustrated here.

In the present application, the tracking control modules and the power quality analysis module can be configured as chips independent of each other, or the N tracking control modules can also be configured as chips independent of each other. In each cycle of the PWM control signals the tracking control modules receive a synchronized signal at least once, so as to enhance the stability of the phase shifts between the PWM control signals output from multiple tracking control modules.

Figure 5:
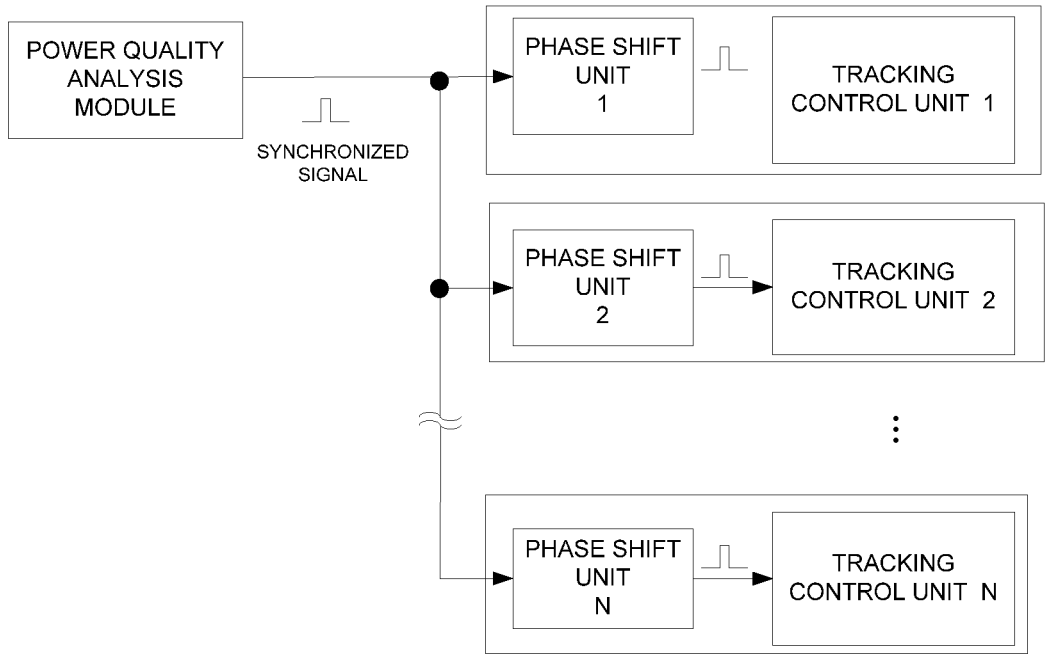
FIG. 5 is a schematic diagram of a control apparatus comprising a phase shift unit and a tracking control unit according to an embodiment of the application.
Figure 7:
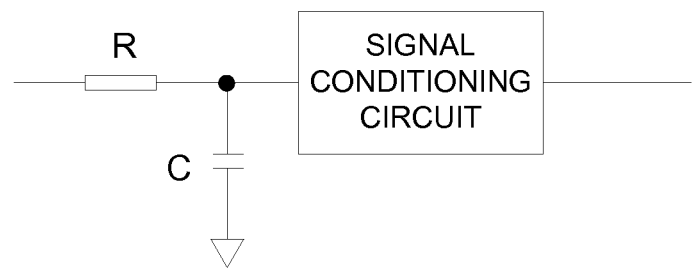
FIG. 7 is an example diagram of a time delay circuit according to an embodiment of the present application.

The above content related phase shift unit can be configured as a hardware delay circuit. The specific structure of the N or N−1 hardware delay circuits can be configured as being the same or different. As an example, when the phase shift unit is located as shown in FIG. 5, specifically the hardware delay circuit can be implemented with a RC phase shift circuit as shown in FIG. 7. The RC phase shift circuit further comprises a signal conditioning circuit (such as comparators, etc.), such that the synchronized signal after being delayed by RC is recovered. To enhance the consistency of the phase shift units, the N or N−1 hardware delay circuits can be implemented by choosing the same circuit structure, with the parameters of the circuit components being different so as to achieve different phase shifts to the synchronized signal. In other embodiments of the first type, the hardware delay circuit can be implemented specifically with D flip-flop(s). As an example, when the phase shift unit is arranged as shown in FIG. 5, the N phase shift units comprise different number of D flip-flops, with the D flip-flops being connected in series with each other in each one of the N phase shift units. Thus, the different numbers of D flip-flops in the phase shift units will lead to different phase shifts. A phase shift circuit adopting such a design can also achieve different phase shifts to a synchronized signal. Of course, in other embodiments of the first type, the hardware delay circuit can be implemented using other hardware circuits, such as the combination of RC flip-flop(s) and D flip-flop(s), no repetitious details need to be given here.

Figure 8:
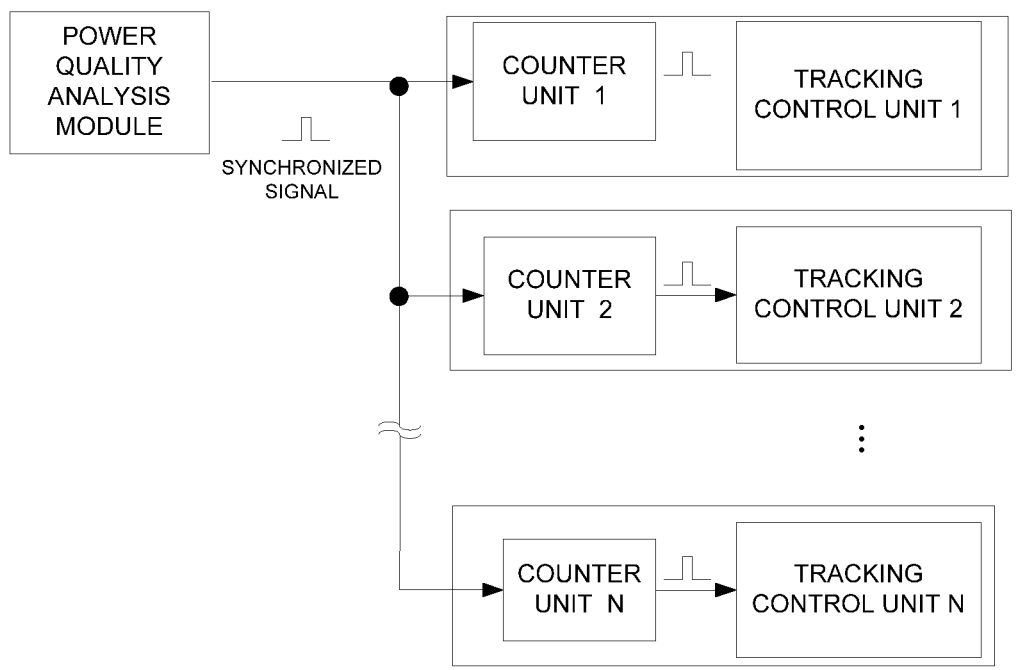
FIG. 8 is a schematic diagram of a control apparatus comprising a counter unit and a tracking control unit according to still another embodiment of the application.

In the second type of embodiments of the control apparatus for the power quality device, the tracking control module differs from the one comprising phase shift unit as described in the first type of embodiments in that it does not adopt a hardware approach to achieve delays, instead, it adopts a software approach to achieve the constant phase shifts between the PWM control signals output by the N tracking control modules. Specifically, as shown in FIG. 8, each of the tracking control modules can comprise a counter unit and a tracking control unit. The counter unit stores a preset phase of a corresponding PWM control signal. Based on a synchronized signal, the counter unit controls the tracking control unit to output a PWM control signal being in accordance with the preset phase stored in the counter unit.

Figure 9:
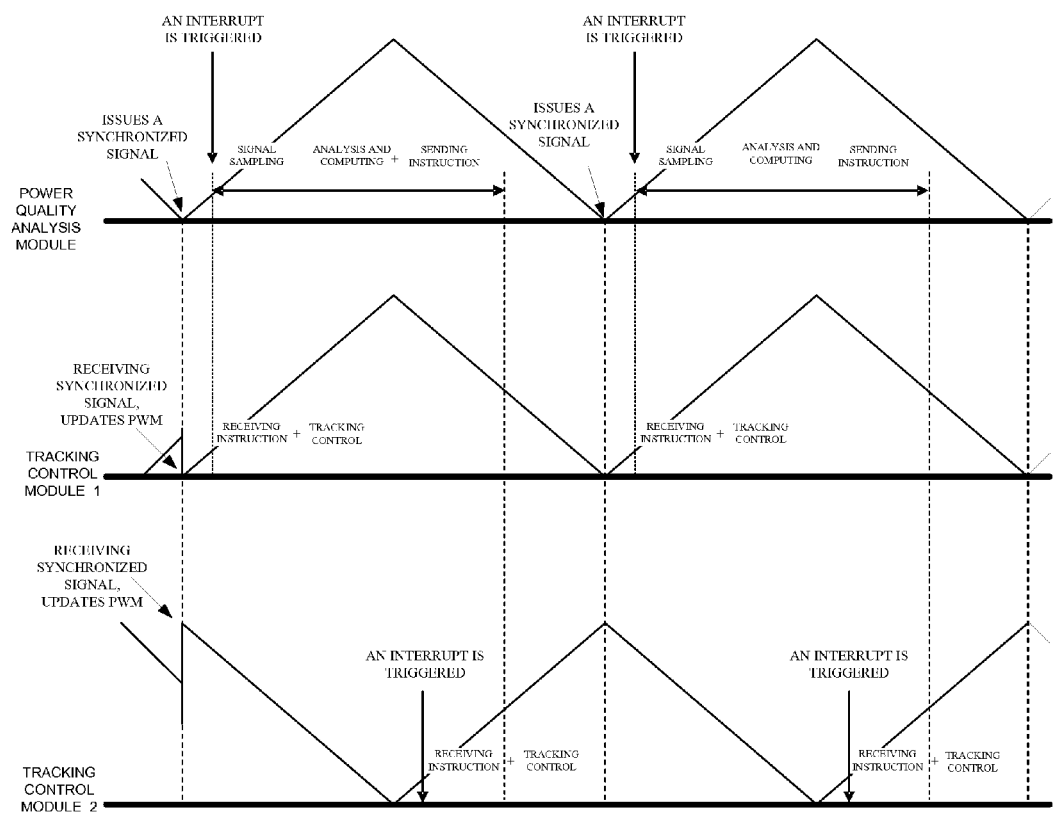
FIG. 9 illustrates a schematic diagram for generating PWM control signals having constant phase shifts according to an embodiment of the present application.
Figure 10:
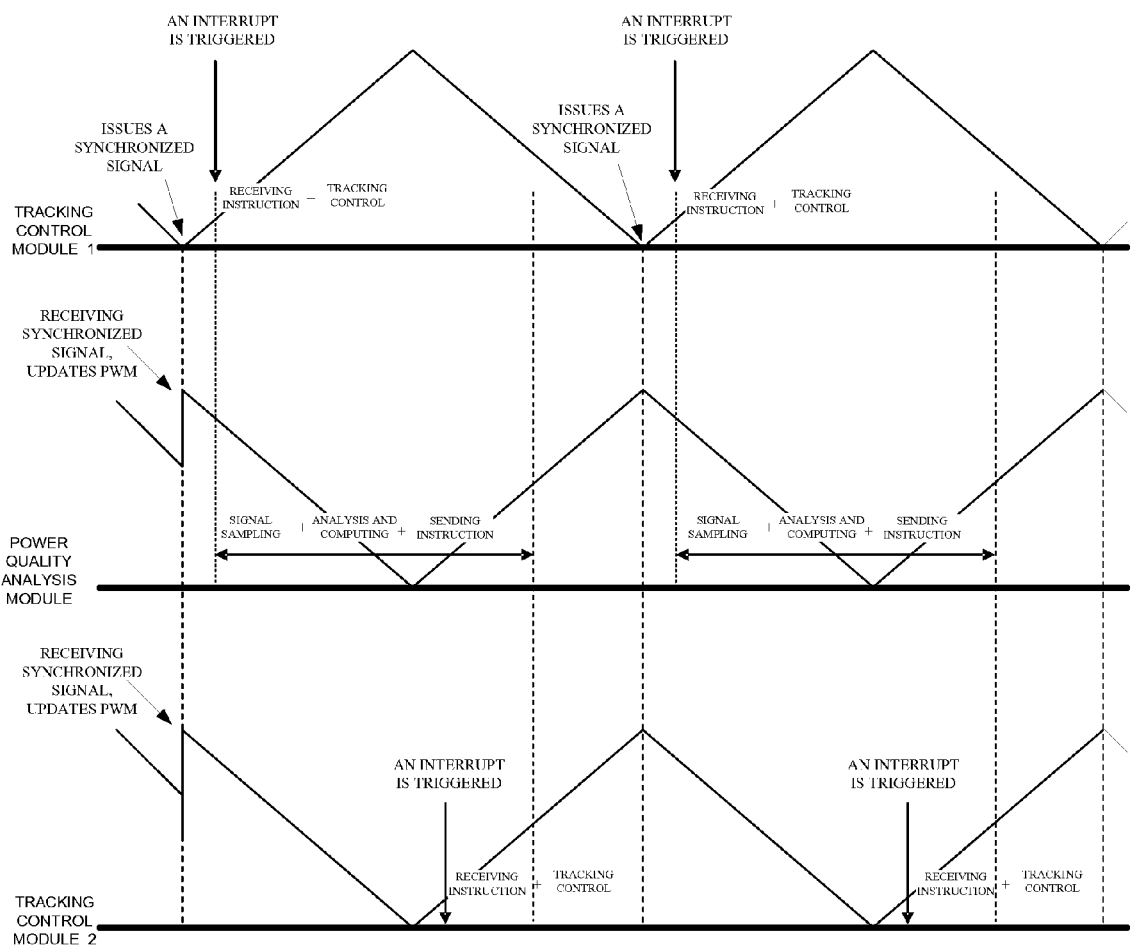
FIG. 10 illustrates a schematic diagram for generating PWM control signals having constant phase shifts according to another embodiment of the present application.

Take one power quality analysis module and two tracking control modules as an example, FIG. 9 and FIG. 10 illustrate a second type of embodiments of the control apparatus. FIG. 9 illustrates a schematic diagram for generating PWM control signals having constant phase shifts, where a synchronized signal is issued by a power quality analysis module. FIG. 10 illustrates a schematic diagram for generating PWM control signals having constant phase shifts, where a synchronized signal is issued by a tracking control module.

As shown in FIG. 9 or FIG. 10, the triangular waveforms shown are PWM carriers, PWM carriers are the basis waveforms for generating PWM control signals, and the cycles of PWM control signals are the same as that of PWM carriers, that is, the PWM control signals and PWM carriers are of the same frequency. These characteristics are well known by those skilled in the art, and no further details need to be given here. As shown in FIG. 9 or FIG. 10, in each cycle of the PWM control signals, the tracking control modules receive a synchronized signal at least once, so as to enhance the stability of the phase shifts between the PWM control signals output from multiple tracking control modules. In other embodiments of the third type, the synchronized signal can be issued at any time instance in a cycle or an integer multiple of cycles of a PWM carrier signal, for example, can be issued at the beginning of a cycle or an integer multiple of cycles of the PWM carrier signal (as shown in FIG. 9 and FIG. 10), but not limited to this.

As shown in FIG. 9, the power quality analysis module issues a synchronized signal in the zero point of a PWM carrier, and an interrupt is triggered, subsequently an interrupt service routine is called. In the interrupt service routine, first, a sample value of the power supply network is obtained, and then the analysis and computing are performed, finally, the power quality information instructing to suppress harmonics and/or compensate power are sent out.

When the first tracking control module receives the synchronized signal sent by the power quality analysis module, it updates automatically the count of its PWM carrier to the zero point (0), thereby triggers an interrupt, and thus an interrupt service routine is called. In the interrupt service routine, first, the instruction information sent by the power quality analysis module in the last switching cycle is received, and then the tracking control is performed.

When the second tracking control module receives the synchronized signal sent by the power quality analysis module, it updates automatically the count of its PWM carrier to the period point (P), thereby triggers an interrupt in the zero point, and subsequently an interrupt service routine is called. The interrupt service routine of the second tracking control unit is basically the same as that of the first tracking control unit.

As can be seen from FIG. 9, since the count of the PWM carrier of the second tracking control module is updated to the period point, and an interrupt is triggered in the zero point, therefore there is a half cycle of phase shift over the first tracking control module, that is, the PWM control signal modulated by the second tracking control module has just a phase shift of 180° over the PWM control signal modulated by the first tracking control module. Thereby, the interleave control is achieved between the two tracking control modules. In case of adding one more tracking control module in the embodiment shown in FIG. 9, the control apparatus comprises one power quality analysis module and three tracking control modules. The first tracking control module can update the count of its PWM carrier to 0 (zero). The second tracking control module can update the count of its PWM carrier to 2P/3, and update the phase to be in the direction of rising edge. The third tracking control module can also update the count of its PWM carrier to 2P/3, but update the phase to be in the direction of falling edge from the peak. The phase shift between the PWM control signals modulated based on these three kinds of PWM carriers is 120°. By analogy, the constant phase shifts between any adjacent two of N PWM carrier signals are 360°/N, such that the interleave control is realized over N tracking control modules.

As shown in FIG. 10, the first tracking control module issues a synchronized signal in the zero point of its PWM carrier, and an interrupt is triggered at the same time, subsequently an interrupt service routine is called. In the interrupt service routine, first, the instruction information sent by the power quality analysis module in the last switching cycle is received, and then the tracking control is performed.

When the power quality analysis module receives the synchronized signal sent by the first tracking control module, it updates automatically the count of its PWM carrier to correspond to the period point (P), and an interrupt service routine is called. In the interrupt service routine, first, a sample value of the power supply network is obtained, and then the analysis and computing are performed, finally, the power quality information instructing to suppress harmonics and/or compensate power are sent out.

When the second tracking control module receives the synchronized signal sent by the first tracking control module, it also updates automatically the count of its PWM carrier to correspond to the period point (P), and triggers an interrupt in the zero point, subsequently an interrupt service routine is called. The interrupt service routine of the second tracking control unit is exactly the same as that of the first tracking control unit.

As can be seen from FIG. 10, since the count of the PWM carrier of the second tracking control module is updated to correspond to the period point, and an interrupt is triggered in the zero point, therefore there is a half cycle of phase shift over the first tracking control module, so that the waveform of the PWM control signal modulated by the second tracking control module has just a phase shift of 360°/2 over the PWM control signal modulated by the first tracking control module, thereby the interleave control is achieved between the two tracking control modules. Similarly to FIG. 9, the constant phase shifts between any adjacent two of N PWM carrier signals are 360°/N, such that the interleave control is realized over the N tracking control modules.

The power quality analysis module and the tracking control modules of the control apparatus of the power quality device disclosed by the first aspect of the present application can be implemented using DSP, Microcontroller, CPU, ARM and other microprocessors, Large Scale Integration (FPGA/CPLD/ . . . ), and analog or digital circuits. In the control apparatus, the synchronized signal being of the PWM carrier frequency is issued by any one of the power quality analysis module and the N tracking control modules, such that the synchronizing operation of all processing units is ensured, which helps to improve the real-time performance and reliability of the system.

Compared to the traditional control apparatus, the control apparatus of the first aspect of the present application reduces the burden of a single processing unit, and has lowered requirements on the performance of the processing unit. In view of meeting the equal performance criteria, it is implemented using a system consisting of multiple low-performance processing units that replace a single processing unit in the traditional technologies, which may help to reduce the cost of the control apparatus. Among them, each processing unit contributes according to its different role and fulfils respectively a part of the function of the system, therefore an effect of splitting-up the whole into small parts is achieved, and the requirements on the performance of processing units could be reduced.

The second aspect of the present application discloses a power quality device, the following content is used for helping to understand the power quality device disclosed in the second aspect.

Figure 11:
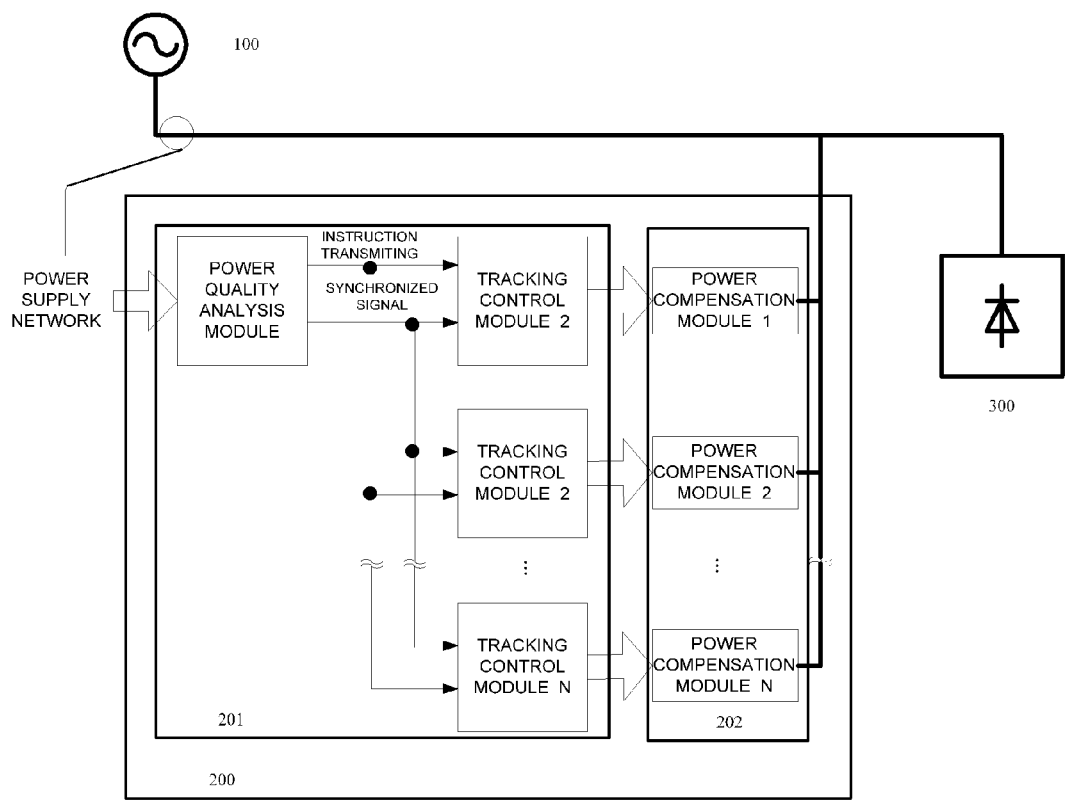
FIG. 11 is a schematic diagram of a power quality device disclosed according to the second aspect of the present application.

For example as shown in FIG. 11, a power quality device 200 disclosed by the second aspect of the present application may comprise a control apparatus 201 and a power apparatus 202 connected thereto. The power apparatus 202 comprises the 1st-the Nth power compensation modules that are connected in parallel with each other. The number of power compensation modules is equal to the number of the tracking control modules of the control apparatus 201. The N tracking control modules of the control apparatus receive respectively instruction information from the power quality analysis module, in order to prevent the harmonics from flowing into the power grid or polluting the power grid, track the instruction information and correspondingly output the N PWM control signals. The N PWM control signals control the 1st-Nth power compensation modules correspondingly. The PWM control signals output by the N tracking control modules, which have a phase shift (360°/N) from each other, thus an interleave control is realized over the N sets of independent power compensation modules. The N tracking control modules control respectively the N independent power compensation modules which are connected in parallel with each other so as to output high-power current. Thus, the N power compensation modules accordingly employ a number of components such as small inductors and/or capacitors (conventional devices) to replace components such as large inductors and/or capacitors used for making up a single power feedback device, thereby costs may be reduced or heat dissipation may be promoted. The power quality device 200 illustrated in FIG. 11 samples the power grid. In other embodiments of the power quality device described in the second aspect of the present application, the power quality device 200 can also sample the loads of the power grid.

As shown in FIG. 11, a power quality device 200 and a load 300 are connected in parallel with each other and then connected to the power grid. The power quality analysis module of the control apparatus 201 samples the power grid 100 to obtain power quality information, and performs analysis and computing on the power quality information so as to output instruction information. The N tracking control modules receive the instruction information, at the same time control the 1st-Nth power compensation modules based on a synchronized signal, thereby the 1st-Nth power compensation modules output compensation power (for example, output the current which has harmonics having equal amplitude and opposite direction to that of the load) and feed it back to the grid, so as to compensate harmonic or reactive power generated by nonlinear loads or by other types of loads that are connected to the grid. Then the electricity flowing into the grid may contain only basic wave component, thereby reducing or even eliminating the pollution of harmonics and reactive power to the grid is achieved. Besides, the power quality analysis module and the N tracking control modules are operated based on a synchronized signal, and there exist constant phase shifts between any adjacent two of the N PWM control signals output by the N tracking control modules. However, in other embodiments of this power quality device 200, the power quality device 200 and the load 300 can also be connected in series with each other and then connected to the grid. In addition, in practical applications, a power quality device can also be arranged at the load 300 to detect the power supply network (for example, the power grid).

In the power quality device disclosed in the second aspect of the present application, the power compensation modules can be configured as single-phase or three-phase power compensation modules. The above power compensation modules can be configured as power switching devices. A power quality device can be configured as an APF (Active Power Filter), a SVG (Static Var Generation), or a DVR (Dynamic Voltage Regulator), and so on.

The present application is described above in various embodiments, but it should be noted that the above embodiments are merely for illustrating the technical solution of the present application, rather than limiting the scope of protection of the present application. Although the present application is described in detail as far as possible by referring to the above embodiments, however a person skilled in the art understands that modifications or equivalent replacements to the technical solution of the present application still belong to the substance and scope of the technical solution of the present application. As long as any improvements or variants to the present application exist, they should fall within the scope of protection of the claims.

What is claimed is:

1. A control apparatus for a power quality device, comprising:
a power quality analysis module, for sampling a power supply network to obtain a power quality information, and performing an analysis and computing on the power quality information so as to output an instruction information;
N tracking control modules, for receiving respectively the instruction information, and tracking the instruction information so as to output N PWM control signals having a same frequency and constant phase shift therebetween, where N is a positive integer and N≥2, thereby to control the power quality device,
wherein the power quality analysis module and the N tracking control modules are operated based on a synchronized signal.

2. The control apparatus according to claim 1, wherein the constant phase shifts between any adjacent two of the N PWM control signals are all 360°/N.

3. The control apparatus according to claim 1, wherein the synchronized signal is generated by the power quality analysis module, and is sent to the N tracking control modules.

4. The control apparatus according to claim 1, wherein the synchronized signal is generated by one of the N tracking modules, and is sent to the other N−1 tracking control modules and the power quality analysis module.

5. The control apparatus according to claim 1, wherein the power quality analysis module and the N tracking control modules receive the synchronized signal which is issued from a signal generation unit.

6. The control apparatus according to claim 1, wherein each of the tracking control modules comprises a phase shift unit and a tracking control unit; the phase shift unit receives the synchronized signal, delays the synchronized signal by the constant phase shift, and then outputs the synchronized signal to the tracking control unit; the tracking control unit tracks the instruction information according to the synchronized signal received, so as to output the PWM control signal.

7. The control apparatus according to claim 6, wherein phase shifts between the synchronized signals after being delayed by the N phase shift units are 360°/N.

8. The control apparatus according to claim 6, wherein the phase shift unit is configured as a RC delay circuit or a D flip-flop delay unit.

9. The control apparatus according to claim 1, wherein each of the tracking control modules comprises a phase shift unit and a tracking control unit; the tracking control unit receives the synchronized signal and the instruction information, and outputs a control signal to the phase shift unit; the phase shift unit delays the control signal, and then outputs the PWM control signal having the preset phase shift.

10. The control apparatus according to claim 9, wherein the phase shift unit is configured as a RC delay circuit or a D flip-flop delay unit.

11. The control apparatus according to claim 1, wherein each of the tracking control modules comprises a counter unit and a tracking control unit; the counter unit stores a preset phase of a corresponding PWM control signal, and based on the synchronized signal controls the tracking control unit to output a PWM control signal corresponding to the preset phase stored in the counter unit.

12. The control apparatus according to claim 1, wherein the tracking control modules and the power quality analysis module are configured as chips independent of each other.

13. The control apparatus according to claim 1, wherein in each cycle of each of the PWM control signals, the tracking control modules receive the synchronized signal at least once.

14. A power quality device, comprising:
   a control apparatus according to claim 1, for outputting the N PWM control signals having constant phase shifts therebetween;
   N power compensation modules, which are connected in parallel with each other, respectively receive corresponding one of the N PWM control signals and generate compensation electric energy, and feed back the compensation electric energy to the power supply network.

15. The power quality device according to claim 14, wherein the constant phase shifts between any adjacent two of the N PWM control signals are all 360°/N.

16. The power quality device according to claim 14, wherein the power supply network comprises a power grid and loads;
   the power quality device and the loads are connected in parallel/series with each other and then connected to the power grid.

17. The power quality device according to claim 14, wherein the power compensation modules are configured as single-phase or three-phase power compensation modules.

18. The power quality device according to claim 14, wherein the power quality device is configured as an active power filter, a static var generator, or a dynamic voltage regulator.

* * * * *